United States Patent [19]
Bos et al.

[11] Patent Number: 5,886,974
[45] Date of Patent: Mar. 23, 1999

[54] COMPACT DISC LOADER AND TRANSPORT APPARATUS

[75] Inventors: Eric Rene Bos, Fountain Valley; Robert L. Montelius, Jr., Laguna Hills; Richard J. Denning, Westminster, all of Calif.

[73] Assignee: MultiDisc Technologies, Laguna Hills, Calif.

[21] Appl. No.: 877,790

[22] Filed: Jun. 18, 1997

[51] Int. Cl.⁶ ................................................. G11B 17/18
[52] U.S. Cl. ............................ 369/178; 369/204; 369/36
[58] Field of Search ............................. 369/34, 36, 77.1, 369/178, 191, 192, 204, 258, 263; 360/92, 98.04; 414/225, 331, 277, 278, 282, 937; 901/39; 294/86.4

[56] References Cited

U.S. PATENT DOCUMENTS

| | | | |
|---|---|---|---|
| 1,858,396 | 5/1932 | Fey . | |
| 4,527,262 | 7/1985 | Manto | 369/33 |
| 4,567,584 | 1/1986 | Kawakami | 369/38 |
| 4,589,101 | 5/1986 | Schatteman et al. | 369/38 |
| 4,607,354 | 8/1986 | Ishibashi et al. | 369/39 |
| 4,614,474 | 9/1986 | Sudo | 414/281 |
| 4,664,454 | 5/1987 | Schatteman et al. | 312/13 |
| 4,682,320 | 7/1987 | D'Alayer de Costemore D'Arc | 369/77.1 |
| 4,701,899 | 10/1987 | D'Alayer de Costemore D'Arc | 369/36 |
| 4,734,814 | 3/1988 | Fujino et al. | 360/133 |
| 4,754,397 | 6/1988 | Varaiya et al. | 364/200 |
| 4,817,070 | 3/1989 | Hug et al. | 369/36 |
| 4,839,758 | 6/1989 | Honjoh | 360/99.06 |
| 4,853,916 | 8/1989 | Tomita | 369/36 |
| 4,855,980 | 8/1989 | Hug et al. | 369/36 |
| 4,891,720 | 1/1990 | Grant et al. | 360/92 |
| 4,912,575 | 3/1990 | Shiosaki | 360/71 |
| 4,945,430 | 7/1990 | Konishi et al. | 360/92 |

(List continued on next page.)

FOREIGN PATENT DOCUMENTS

| | | |
|---|---|---|
| 66317B1 | 12/1982 | European Pat. Off. . |
| 284445A1 | 9/1988 | European Pat. Off. . |
| 288165A2 | 10/1988 | European Pat. Off. . |
| 516496A2 | 12/1992 | European Pat. Off. . |
| 542482 | 5/1993 | European Pat. Off. . |
| 550282A2 | 7/1993 | European Pat. Off. . |
| 589479A2 | 3/1994 | European Pat. Off. . |
| 662687A1 | 7/1995 | European Pat. Off. . |
| 779619A2 | 6/1997 | European Pat. Off. . |
| 2 538 597 | 6/1984 | France . |
| 4-310367 | 11/1992 | Japan . |
| 4-341968 | 11/1992 | Japan . |
| 6-84265 | 3/1994 | Japan . |
| 6-195838 | 7/1994 | Japan . |
| 2286715 | 8/1995 | United Kingdom . |

*Primary Examiner*—William R. Korzuch
*Attorney, Agent, or Firm*—Stetina Brunda Garred & Brucker

[57] ABSTRACT

A compact disc loader and transport apparatus for placement within a compact disc storage magazine for transporting selected compact discs, with the magazine including a movement mechanism for movement of the loader and transport apparatus between disc storage shelves and one or more drive mechanisms for retrieval and delivery of discs. The loader and transport apparatus has a plurality of disc engagers for cooperative frictional rotational engagement of a compact disc presented thereto at least two edge sites of the disc. Each disc engager is mounted at a periphery site of a respective motor driven rotatable platform whose rotation in cooperation with the rotation of at least one other platform moves the disc from or to a disc transport position of the loader and transport apparatus and thereafter cease rotation. The loader and transport apparatus can then travel for delivery and/or further disc retrieval at another storage shelf or drive mechanism. It is preferred that the loader and transport apparatus have opposing openings through either of which a disc can be made to proceed by the rotatable platforms to effectuate service to opposing disc storage shelves or disc drive mechanisms.

3 Claims, 2 Drawing Sheets

U.S. PATENT DOCUMENTS

| | | | |
|---|---|---|---|
| 4,969,140 | 11/1990 | Koiwa et al. | 369/77.1 |
| 4,979,160 | 12/1990 | Araki | 369/191 X |
| 4,988,038 | 1/1991 | Mitsuyama | 229/1.5 R |
| 5,001,582 | 3/1991 | Numasaki | 360/98.06 |
| 5,020,043 | 5/1991 | Kohler | 369/36 |
| 5,022,019 | 6/1991 | Motoyoshi et al. | 369/36 |
| 5,036,503 | 7/1991 | Tomita | 369/36 |
| 5,041,929 | 8/1991 | Fryberger et al. | 360/92 |
| 5,045,958 | 9/1991 | Leonard et al. | 360/92 |
| 5,056,077 | 10/1991 | Morikawa et al. | 369/77.1 |
| 5,058,100 | 10/1991 | Yoshii | 369/291 |
| 5,064,069 | 11/1991 | Su | 206/425 |
| 5,067,116 | 11/1991 | Kadrmas | 369/37 |
| 5,091,898 | 2/1992 | Bessho et al. | 369/77.2 |
| 5,128,912 | 7/1992 | Hug et al. | 369/38 |
| 5,136,562 | 8/1992 | Staar | 369/36 |
| 5,146,451 | 9/1992 | Kang | 369/270 |
| 5,161,682 | 11/1992 | Seifert et al. | 206/309 |
| 5,173,894 | 12/1992 | Kido | 369/77.1 |
| 5,187,695 | 2/1993 | Schindler et al. | 369/37 |
| 5,189,656 | 2/1993 | Masaki et al. | 369/47 |
| 5,191,983 | 3/1993 | Hardy | 211/40 |
| 5,195,066 | 3/1993 | Amemiya et al. | 369/32 |
| 5,197,056 | 3/1993 | Van Heusden et al. | 369/37 |
| 5,206,845 | 4/1993 | Baxter et al. | 369/34 |
| 5,210,728 | 5/1993 | Noguchi et al. | 369/36 |
| 5,214,628 | 5/1993 | Langman et al. | 369/37 |
| 5,216,645 | 6/1993 | Sakayama | 369/36 |
| 5,218,583 | 6/1993 | Miyajima | 369/36 |
| 5,228,016 | 7/1993 | Menke | 369/36 |
| 5,235,579 | 8/1993 | Ross | 369/37 |
| 5,247,500 | 9/1993 | Miyoshi et al. | 369/38 |
| 5,255,251 | 10/1993 | Fitzgerald et al. | 369/36 |
| 5,255,255 | 10/1993 | Kaneda et al. | 369/77.1 |
| 5,267,225 | 11/1993 | Fukasawa et al. | 369/36 |
| 5,274,620 | 12/1993 | Sipos | 369/77.2 |
| 5,285,333 | 2/1994 | Barr et al. | 360/92 |
| 5,289,441 | 2/1994 | Domberg et al. | 369/34 |
| 5,327,412 | 7/1994 | Lee | 369/75.2 |
| 5,370,243 | 12/1994 | Rosario | 211/40 |
| 5,373,489 | 12/1994 | Sato et al. | 369/36 |
| 5,429,470 | 7/1995 | Nicol et al. | 414/331 |
| 5,431,520 | 7/1995 | Brugger | 414/277 |
| 5,473,585 | 12/1995 | Kim | 369/36 |
| 5,481,514 | 1/1996 | Yamasaki et al. | 369/36 |
| 5,513,156 | 4/1996 | Hanaoka et al. | 369/34 |
| 5,539,712 | 7/1996 | Menke et al. | 369/36 |
| 5,544,148 | 8/1996 | Nakamichi | 369/192 |
| 5,546,366 | 8/1996 | Dang | 369/36 |
| 5,548,567 | 8/1996 | Sawai | 369/36 |
| 5,561,658 | 10/1996 | Nakamichi et al. | 369/263 |
| 5,610,882 | 3/1997 | Dang | 369/36 |
| 5,638,347 | 6/1997 | Baca et al. | 369/34 |
| 5,715,948 | 2/1998 | Hung | 211/40 |
| 5,720,386 | 2/1998 | Allsop et al. | 206/308.1 |

COMPACT DISC LOADER AND TRANSPORT APPARATUS

FIELD OF THE INVENTION

This invention relates in general to computer data retrieval from compact discs, and in particular to retrieving and delivering compact discs within a storage magazine structure with a compact disc loader and transport apparatus having a plurality of disc engagers each mounted at a periphery site of one respective motor driven rotatable platform for frictional rotational engagement of a compact disc presented thereto at edge sites of the disc to thereby move the disc from or to the loader and transport apparatus.

BACKGROUND OF THE INVENTION

Compact disc storage and retrieval has become a significant factor for consideration in view of the proliferation of use of these discs for data storage in association with computerized information that must be readily available. While individual discs are capable of accepting relatively large amounts of data, the amount of data stored for many applications is immense and therefore requires a significant number of discs. In addition to requiring large data storage capacity, rapid retrieval of discs is also desired so that data from the discs can be accessed more quickly.

One major factor in determining the efficiency of disc retrieval and delivery is found in the capabilities of the disc loader and transport apparatus that travels among disc storage sites and drive mechanisms to accomplish disc movement to and from such storage sites and drive mechanisms. Specifically, if the loader and transport apparatus is able to quickly retrieve, carry and deliver a disc, data from that disc can be made available forthwith. If the loader and transport apparatus additionally is able to serve opposing disc storage banks of a magazine structure by having opposing openings thereto, efficiency improves more vividly. Thus, it is apparent that a need is present for a disc loader and transport apparatus that can retrieve and deliver discs in a timely manner. Accordingly, a primary object of the present invention is to provide a compact disc loader and transport apparatus for placement within a compact disc storage magazine wherein the loader and transport apparatus comprises a plurality of disc engagers for frictional engagement of a compact disc presented thereto at edge sites of the disc to thereby cooperatively move the disc from or to the loader and transport apparatus.

Another object of the present invention is to provide a compact disc loader and transport apparatus wherein each disc engager is freely rotatable and is mounted at a periphery site of a respective rotatable platform, with four rotatable platforms situated to form four quadrants and four resulting disc engagers.

Yet another object of the present invention is to provide a compact disc loader and transport apparatus wherein the loader and transport apparatus has two opposing openings through either of which a disc can be made to proceed by the disc engagers through movement of the rotatable platforms as such a disc travels between the loader and transport apparatus and a storage shelf or a disc drive mechanism.

These and other objects of the invention will become apparent throughout the description thereof which now follows.

SUMMARY OF THE INVENTION

The present invention is a compact disc loader and transport apparatus for placement within a compact disc storage magazine for transporting selected compact discs, with the magazine including a movement mechanism for movement of the loader and transport apparatus between disc storage shelves and one or more drive mechanisms for retrieval and delivery of discs. In particular, the loader and transport apparatus comprises a plurality of disc engagers for cooperative frictional rotational engagement of a compact disc presented thereto at at least two edge sites of the disc. Each disc engager is mounted at a periphery site of a respective motor driven rotatable platform whose rotation in cooperation with the rotation of at least one other platform moves the disc from or to a disc transport position of the loader and transport apparatus. Thereafter, platform rotation ceases. The loader and transport apparatus can then travel for delivery and/or further disc retrieval at another storage shelf and/or drive mechanism.

In a preferred embodiment, one respective freely rotatable disc engager is mounted at a periphery site of each of four rotatable platforms that are situated to form four quadrants to thereby provide each quadrant with one disc engager. In this embodiment the disc transport position is that wherein the disc is held by all four disc engagers. It is preferred that the loader and transport apparatus have opposing openings through either of which a disc can be made to proceed by the disc engagers through movement of the rotatable platforms. Such construction effectuates service to opposing disc storage shelves of the magazine by a single loader and transport apparatus as the loader and transport apparatus travels among storage shelves and one or more disc drive mechanisms.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
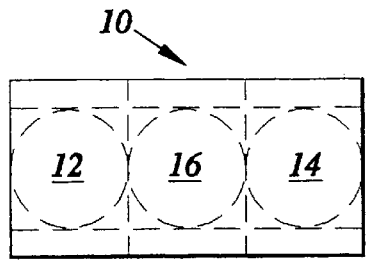
FIG. 1 is a schematic illustration of a top plan view of a computer compact disc storage site with a disc loader and transport apparatus.
Figure 2:
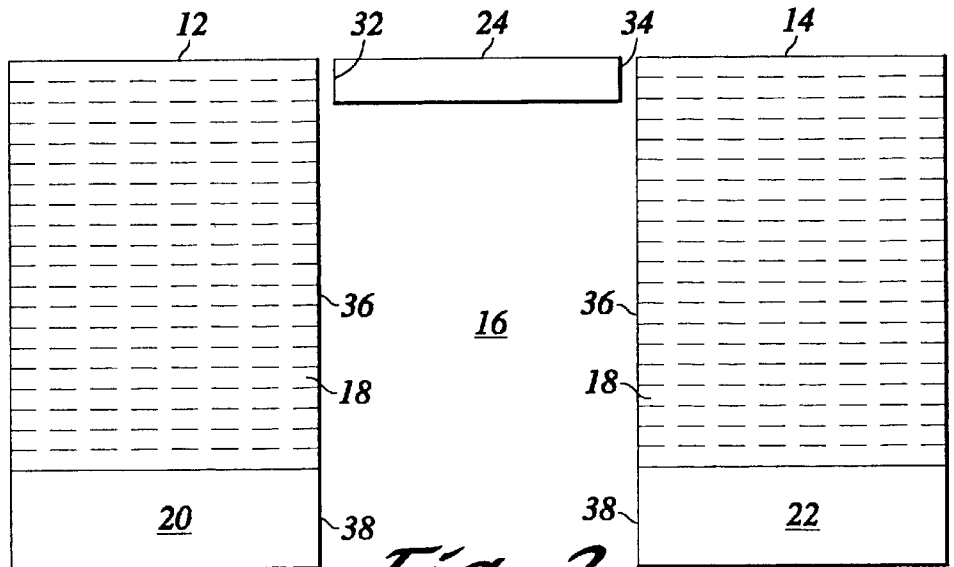
FIG. 2 is an enlarged schematic illustration of a side elevation view of the storage site and loader and transport apparatus of FIG. 1.

Referring to FIGS. 1 and 2, a disc storage magazine 10 having two opposing storage banks 12, 14 with an access channel 16 therebetween is shown. Each storage bank 12, 14 has a plurality of storage shelves 18 each able to accommodate one compact disc for storage, with each shelf 18 having an opening 36. Situated at the base of each storage bank 12, 14 is a disc drive mechanism 20, 22 each having an opening 38 through which a disc can pass, and capable of retrieving data from a disc as known in the art. Disposed within the access channel 16 is a loader and transport apparatus 24 for retrieving, transporting and delivering compact discs among the storage banks 12, 14 and disc drive mechanisms 20, 22.

Figure 3:
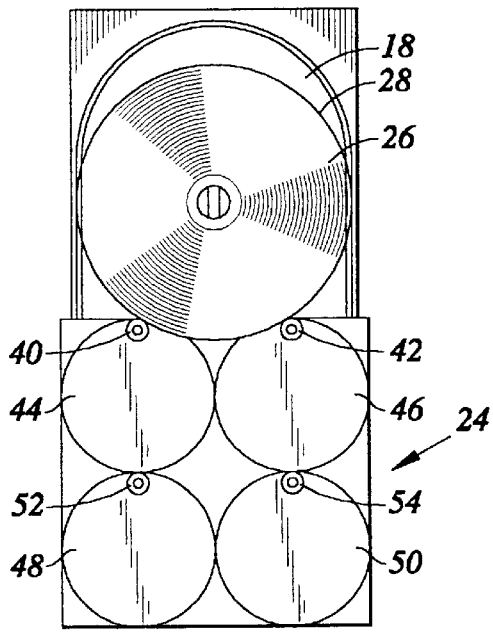
FIG. 3 is a schematic illustration of a top plan view of a disc storage shelf and disc loader and transport apparatus.
Figure 4A:
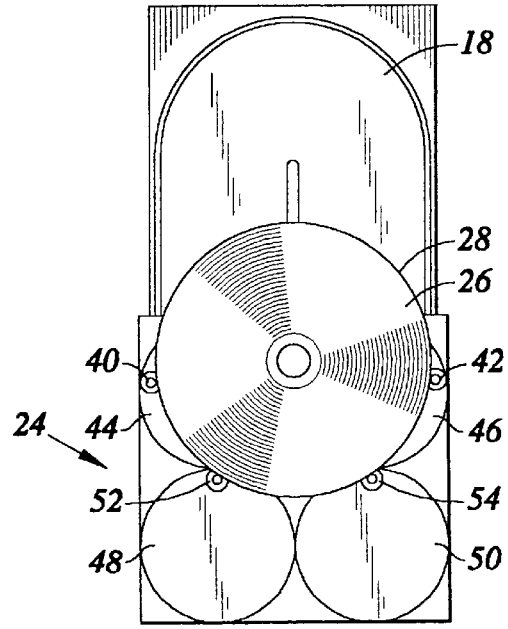
FIGS. 4a–4d are schematic illustrations of respective top plan views of the disc loader and transport apparatus in sequence as a compact disc is loaded therein.
Figure 4B:
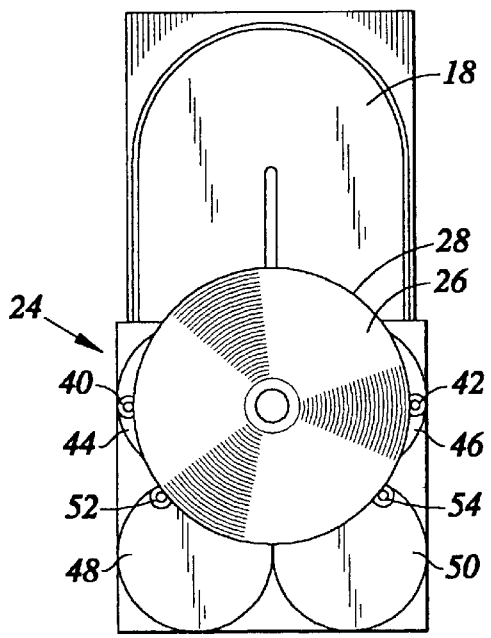
Figure 4C:
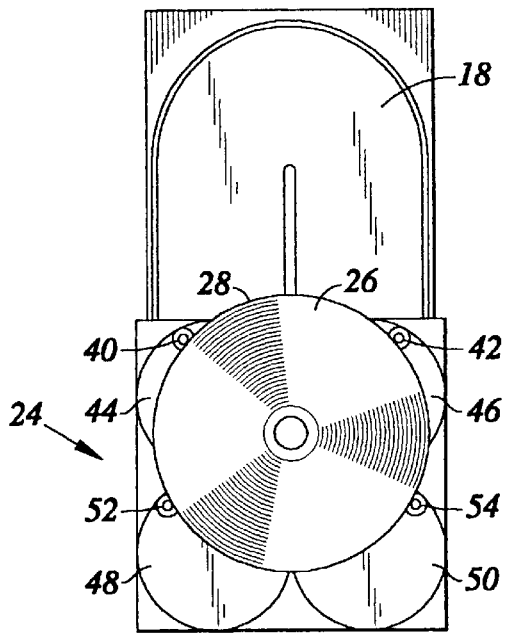
Figure 4D:
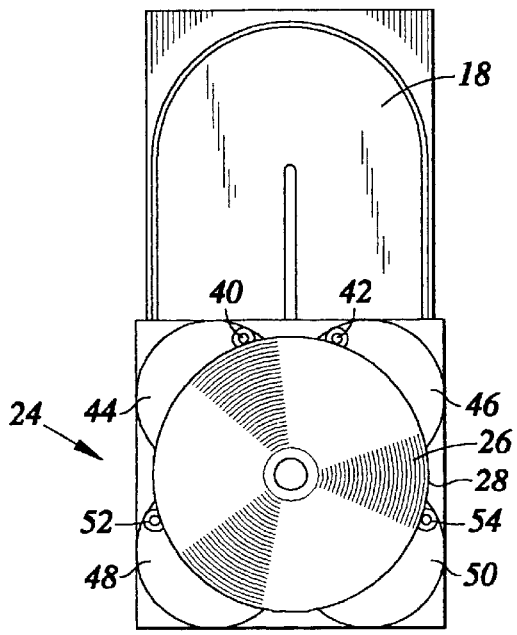

FIGS. 3–4d show a top plan view of one storage shelf 18 and the loader and transport apparatus 24. The shelf 18 is meant to be representative of any such shelf known in the art having a disc movement mechanism (not shown) capable of moving a disc 26 outwardly through the opening 36. As shown in FIG. 3, the disc 26 has been moved a short distance from the storage site of the shelf 18 through the opening 32 of the loader and transport apparatus 24 where two sites of the edge 28 of the disc 26 are frictionally engaged by two respective freely rotatable disc engager wheels 40, 42 disposed at the peripheries of cooperating respective motor driven rotatable platforms 44, 46 of the loader and transport apparatus 24. Two additional motor driven rotatable platforms 48, 50 complete a quadrant configuration of four platforms, with the additional platforms 48, 50 each also having a respective peripherally mounted freely rotatable disc engager wheel 52, 54 for frictional engagement of the edge 28 of the disc 26.

Figure 5:
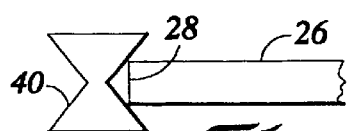
FIG. 5 is a side elevation view of a disc engager of the disc loader and transport apparatus and a portion of a compact disc.

FIGS. 4a–4d show the progression of disc retrieval by the loader and transport apparatus 24 until, as shown in FIG. 4d, the disc 26 is completely retained by respective wheels 40, 42, 52, 54. As illustrated in FIG. 5, each wheel 40, 42, 52, 54 is substantially hour-glass shaped, with the central portion 56 of each frictionally engaged with the edge 28 of the disc 26. While the illustration of FIGS. 4a–4d show retrieval of a disc 26 through the opening 32 of the loader and transport apparatus 24, it is apparent that retrieval of a disc 26 can likewise occur through the opposing opening 34 from the storage bank 14.

In operation, a disc 26 initially is moved outwardly from a shelf 18 by the disc movement mechanism of the shelf 18 toward the loader and transport apparatus 24 positioned adjacent the shelf 18. The edge 28 of the disc 26 engages two rotating engager wheels 40, 42 (or 52, 54 if entering from the other side) while the disc movement mechanism of the shelf 18 continues to push the disc 26 from the shelf. The engaged rotating engager wheels 40, 42 move outwardly as the platforms 44, 46 (or 48, 50 if entering from the other side) are appropriately rotated. Once the disc 26 is over about 50% off of the shelf 18, the rotatable platforms 44, 46, 48, 50, whose respective engager wheels are frictionally engaged with the edge 28 of the disc 26, have full responsibility for moving the disc 26 to a transport position as shown in FIG. 4d. Once the transport position is reached, rotation of the platforms 44, 46, 48, 50 ceases. The loader and transport apparatus 24 then travels through the access channel 16 to become adjacent the disc drive mechanisms 20, 22, at which time rotation of the platforms 44, 46, 48, 50 commences to reverse the process of disc retrieval as described above and deliver the disc 26 a drive mechanism. In like manner, a disc can be retrieved from a disc drive mechanism and delivered to a storage shelf of either storage bank 12, 14, as would be recognized by a skilled artisan.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A compact disc loader and transport apparatus for a compact disc having a continuous peripheral edge, the loader and transport apparatus comprising:
   a housing;
   a plurality of platforms rotatably mounted to the housing;
   a plurality of motors, motor being each mechanically coupled to respective one of the plurality of platforms; and
   a plurality of disc engagers, each disc engager being eccentrically rotatably mounted above one of the platforms at the periphery thereof so that the disc engager rotates around the center of the platform, and being sized and configured to frictionally engage a portion of the peripheral edge when the compact disc is fully advanced onto the loader and transport apparatus;
   the platforms being arranged such that the independent rotation thereof by respective ones of the motors is coordinated in a manner wherein the compact disc is frictionally engaged by at least two of the disc engagers to selectively maneuver the compact disc into and out of the compact disc loader and transport apparatus.

2. The compact disc loader and transport apparatus of claim 1 wherein each of the disc engagers comprises a roller having a generally V-shaped slot which extends about the periphery thereof and is adapted to engage a portion of the peripheral edge.

3. The compact disc loader and transport apparatus of claim 1 wherein:
   four platforms are rotatably mounted to the housing in a generally square pattern; and
   the peripheral edge is engaged by four disc engagers when the compact disc is fully advanced onto the loader and transport apparatus.

* * * * *